No. 653,506. Patented July 10, 1900.
V. E. EDWARDS.
APPARATUS FOR CUTTING AND HANDLING BAND IRON.
(Application filed Dec. 31, 1897.)
(No Model.)

Witnesses:
Samuel T. Hobbs
M C Price

Inventor:
Victor E. Edwards
By Rufus B. Fowler
Attorney.

UNITED STATES PATENT OFFICE.

VICTOR E. EDWARDS, OF WORCESTER, MASSACHUSETTS, ASSIGNOR TO THE MORGAN CONSTRUCTION COMPANY, OF SAME PLACE.

APPARATUS FOR CUTTING AND HANDLING BAND-IRON.

SPECIFICATION forming part of Letters Patent No. 653,506, dated July 10, 1900.

Application filed December 31, 1897. Serial No. 664,804. (No model.)

*To all whom it may concern:*

Be it known that I, VICTOR E. EDWARDS, a citizen of the United States, and a resident of Worcester, in the county of Worcester and State of Massachusetts, have invented a new and useful Improvement in Apparatus for Cutting and Handling Band-Iron, of which the following is a specification, accompanied by drawings forming a part of the same, in which—

Figure 1:
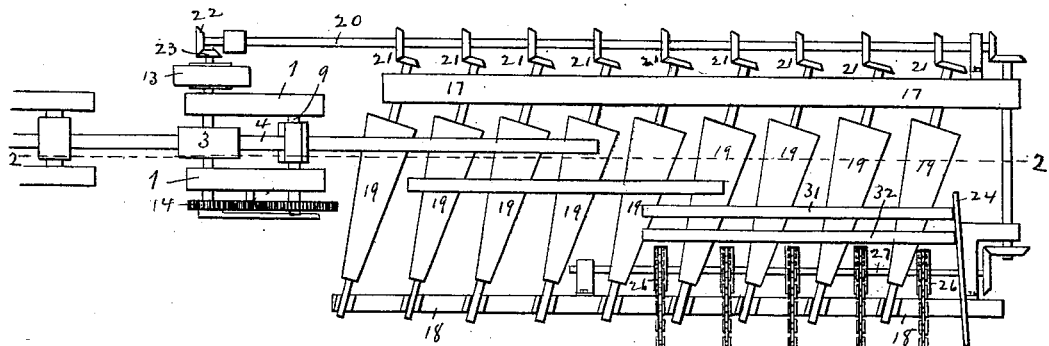
Figure 2:
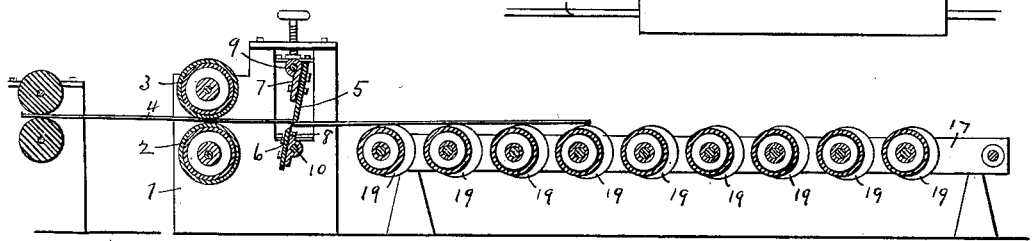
Figure 4:
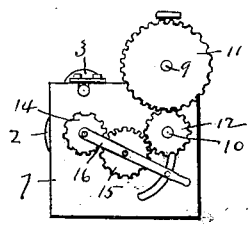
Figure 3:
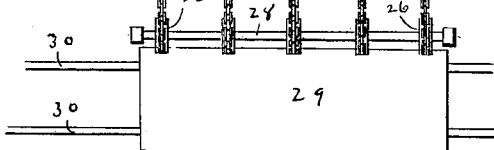

Figure 1 represents a plan view of an apparatus for cutting and handling band-iron embodying my invention. Fig. 2 is a side elevation of the same shown in vertical sectional view on line 2 2, Fig. 1. Fig. 3 is an end view showing one of the conical rolls and conveyer-chains, and Fig. 4 is a side elevation of the cutting apparatus.

Similar numerals refer to similar parts in the different figures.

The object of my invention is to provide an apparatus by which a continuous strip of band-iron as delivered from the last pair of rolls of a reducing-mill can be cut into pieces of a predetermined length and the severed pieces gathered together, with their advancing ends even, and delivered by a sidewise movement upon a car or truck; and I attain this object by means of the apparatus hereinafter described, and set forth in the annexed claims.

Referring to the drawings, 1 denotes the framework by which the cutting and feeding mechanism is supported.

2 denotes the lower feed-roll, which is positively driven, and 3 the upper weighted feed-roll, between which and the lower feed-roll a continuous strip of band-iron 4 is delivered to the cutting mechanism.

5 and 6 denote, respectively, the upper and lower rotating shear-blades, which are provided with cutting edges arranged to coöperate in severing the strip of band-iron at predetermined intervals. The shear-blades 5 and 6 are adjustably attached to radial arms 7 and 8, carried by shafts 9 and 10, by means of bolts passing through slots in the shear-blades 5 and 6 and entering screw-threaded holes in the radial arms 7 and 8 in the usual and well-known manner of attaching shear-blades to revolving cutter-heads, thereby allowing the cutting edges of each of the shear-blades to be adjusted radially. The shafts 9 and 10 are connected by "change-gears" 11 and 12, whereby the ratio of speed between the shear-blades is made to correspond inversely to the ratio of the distances of their cutting edges from their axes of rotation, so that the cutting edges of each shear-blade will move at the same velocity. The shaft of the lower feed-roll 2 carries a belt-pulley 13, by which the feed-roll is driven, and a spur-gear 14, which drives the lower-shear-blade shaft 10 through an intermediate gear 15, rotating upon a stud carried by an arm 16, which is pivoted concentrically with the gear 14 and is provided with any known means by which the arm is held in proper position to hold the gear 15 in engagement with the change-gear 12 on the lower-shear-blade shaft.

The bearings of the upper-shear-blade shaft 9 are capable of being raised or lowered in the framework 1 by any suitable means in order to vary the distance between the shear-blade shafts to allow them to be connected by gears of different diameters and change the ratio of speed of the shear-blades. The upper shear-blade is represented in the drawings with its cutting edge at twice the radial distance from its axis of rotation as the lower shear-blade and driven at one-half the speed, giving the same velocity to the cutting edges of both shear-blades and equal to the velocity of the strip of band-iron as it is fed between the shear-blades by the feed-rolls 2 and 3 and causing the strip to be severed at each alternate revolution of the lower shear-blade, making the length of the severed strip equal to twice the periphery of the lower shear-blade. By changing the radius of the upper shear-blade and adjusting the gears by which the upper and lower shear-blades are operatively connected the length of the severed pieces can be changed—as, for example, if the radii of the shear-blades were as four to five and the velocity of their cutting edges kept at that of the moving strip of band-iron the blades would coöperate to sever the strip once during each five revolutions of the lower shear-blade and four revolutions of the upper shear-blade, as the ratio of speed of the shear-blades is as four to five.

In front of the cutting mechanism are arranged a double row of journal-bearings 17 and 18 in lines parallel with the lines of the motion of the strip of band-iron 4 and supporting a series of conical rolls 19, each of which is positively driven from a driving-shaft 20 by beveled gears 21. The driving-shaft 20 is conveniently driven by an attached bevel-gear 22 engaging a bevel-gear 23 on the shaft of the lower feed-roll 2. The series of conical rolls 19 are arranged in a line parallel with the line of motion of the continuous strip of band-iron 4, with the larger ends of the rolls in alinement with the feeding and cutting mechanism and adjacent thereto, so that the severed strips of band-iron will be delivered from the cutting mechanism upon the larger ends of the rolls 19. The axes of the rolls 19 are arranged in a horizontal plane and at an oblique angle to the line of motion of the strip of band-iron as it passes from the cutting mechanism, bringing the upper surfaces of the conical rolls into an inclined plane, which forms a supporting-surface for the severed pieces of band-iron. The rotation of the conical rolls 19 imparts both an endwise and sidewise motion to the severed pieces of band-iron, so that each piece as it moves forward is also moved laterally toward the smaller ends of the rolls, owing to the obliquity of the axes of the rolls, aided by gravity due to the inclination of the upper surfaces of the rolls. As each piece of band-iron moves forward it is carried toward the smaller ends of the rolls 19, and its endwise motion thereby becomes decreased in speed until it is checked by a stop-plate 24, placed in the path of the pieces, and the reduction in the speed of the severed pieces as they approach the smaller ends of the conical rolls lessens their momentum and prevents them from becoming bent by their impact against the stop-plate. The pieces of band-iron are moved sidewise off the rolls 19 upon a series of endless chains 25, which are supported upon sprocket-wheels 26, carried upon parallel shafts 27 and 28, forming a conveyer by which the pieces of band-iron are delivered upon a car or truck 29, standing upon a track 30.

The stop-plate 24 is preferably placed at a slight angle to the line of sidewise movement of the pieces of band-iron, thereby providing a slight clearance, so that a piece coming in contact with the stop-plate before it reaches the point of delivery from the rolls 19 will be allowed a slight endwise movement during the continuance of its sidewise movement upon the rolls 19. For example, the piece 31, which has been checked in its endwise movement, will be moved slightly endwise while passing into the position of piece 32, owing to the obliquity of the stop-plate 24 to the line of sidewise motion of the severed piece, thereby avoiding friction between the ends of the pieces of band-iron and the stop-plate. It will be obvious that the sidewise movement of the pieces of band-iron would be accomplished by the obliquity of the axes of a series of cylindrical rolls with their upper supporting-surfaces arranged in a horizontal plane; but I prefer to incline the supporting-surfaces so that the sidewise motion will be aided by gravity, and I also prefer to secure the inclination of the supporting-surfaces of the rolls by making them conical, as by that means I secure the desired reduction in the endwise movement of the pieces.

The operation of my improved apparatus is as follows: The shear-blades 5 and 6 are adjusted radially to make the circular paths of their cutting edges at the desired ratio, and the shear-blade shafts are connected by change-gears, in order to equalize the velocity of the cutting edges of the shear-blades and cause them to coöperate at such a multiple of the revolutions of the shear-blades as shall give the desired length to the severed pieces as the strip of band-iron is fed between the shear-blades by the action of the feed-rolls. Each of the severed pieces is delivered from the larger ends of the series of revolving conical rolls 19, upon which the pieces move both endwise and sidewise, until with their endwise speed reduced they are brought against the stop-plate 24, placed at a slight inclination to their line of sidewise movement. The rotation of the rolls 19 continues to move the pieces sidewise toward the smaller ends of the rolls, and the inclination of the stop-plate permits a slight endwise motion, which is dependent upon the sidewise motion of the piece, until the severed pieces, with their ends evened, are delivered from the rolls 19 upon a conveyer, consisting in the present instance of the series of endless chains 25, by which the pieces are delivered upon the car or truck.

What I claim as my invention, and desire to secure by Letters Patent, is—

1. The combination with a revolving shear-blade and means for rotating the same, of a coöperating revolving shear-blade, means for rotating the same at a different speed whereby the cutting edges of said shear-blades are made to coöperate at multiple revolutions, substantially as described.

2. The combination with a revolving shear-blade and means for rotating the same, of a coöperating revolving shear-blade, means for rotating the same at a different speed, and means for feeding a strip of band-iron between said blades, whereby said strip is severed at predetermined lengths, substantially as described.

3. The combination of a pair of revolving shear-blades having their cutting edges rotating in circular paths of different diameters, and means for rotating said blades at different speeds corresponding inversely to the diameters of their circular paths whereby the cutting edges of said shear-blades are caused to move at a uniform velocity, substantially as described.

4. The combination of a pair of revolving shear-blades having their cutting edges rotating in circular paths of different diameters, means for rotating said blades at different speeds corresponding inversely to the diameters of said circular paths, and means for feeding a strip of band-iron between said blades, substantially as described.

5. The combination of a pair of radially-adjustable, revolving shear-blades and means for rotating said blades at different speeds corresponding inversely to the radial distance of their cutting edges from their axes of rotation, substantially as described.

6. The combination of a pair of radially-adjustable, revolving shear-blades, means for feeding a strip of band-iron between said shear-blades and means for varying the speed of said shear-blades, whereby the velocity of the cutting edge of each of said shear-blades shall correspond with the velocity of the strip of band-iron, substantially as described.

7. The cutting mechanism comprising a pair of revolving shear-blades having differential radii and inversely-corresponding differential speeds, substantially as described.

8. The cutting mechanism comprising a pair of revolving shear-blades having differential radii and inversely-corresponding differential speeds and means for feeding a strip of band-iron between said blades at a speed corresponding to the velocity of the cutting edges of said blades, substantially as described.

9. The combination with a pair of revolving shear-blades of a conveyer comprising a series of rolls presenting supporting-surfaces in a single plane and having their axes at an oblique angle to the axes of said shear-blades, substantially as described.

10. The combination with a cutting mechanism, of a conveyer for removing the severed pieces of band-iron and comprising a series of revolving rolls arranged in a straight line upon which the severed pieces are supported, said rolls having their axes at an oblique angle to said straight line, whereby a lateral or sidewise movement is imparted to the severed pieces as they are moved endwise by the rotation of the rolls, substantially as described.

11. The conveying mechanism comprising a series of rolls presenting supporting-surfaces and arranged in a straight line and having their axes at an oblique angle to said straight line, whereby an endwise and sidewise movement is imparted to the severed pieces of band-iron, substantially as described.

12. The conveying mechanism comprising a series of rolls arranged in a straight line with their axes at an oblique angle to said straight line whereby an endwise and sidewise movement is imparted to the strips of band-iron, said rolls having their supporting-surfaces in an inclined plane, whereby the sidewise movement of the severed pieces is aided by gravity, substantially as described.

13. The combination of a series of revolving rolls for supporting the severed pieces arranged in a straight line with their axes placed at an oblique angle thereto, whereby an endwise and sidewise motion is imparted to the severed pieces and a stop-plate placed in the path of the severed pieces as they are moved endwise by said rolls, substantially as described.

14. The combination of a series of rolls upon which the severed pieces of band-iron are supported arranged in a straight line with their axes at an oblique angle thereto, whereby an endwise and sidewise motion is imparted to the severed pieces, and a stop-plate placed in the path of said pieces, said stop-plate being slightly inclined to the line of the sidewise movement of the severed pieces, whereby a slight endwise movement of the severed pieces is permitted consequent upon their continued endwise movement, substantially as described.

15. The combination of means for imparting an endwise and sidewise motion to the severed pieces of band-iron, means for evening the ends of the severed pieces, and a conveyer by which the severed strips are conveyed by a sidewise movement, substantially as described.

16. The combination of means for imparting an endwise motion to the severed pieces of band-iron at a gradually-reducing speed and a simultaneous sidewise motion and means for limiting the endwise motion of the severed pieces, substantially as described.

17. The combination with cutting mechanism of a series of rolls forming a conveyer upon which the severed pieces of band-iron are carried away from the cutting mechanism, said rolls having varying diameters, and means for moving the severed pieces sidewise upon sections of the conveying-rolls of less diameter, whereby the endwise motion of the severed pieces is reduced in speed, substantially as described.

18. The combination of a series of conical rolls, means for driving said rolls, whereby an endwise motion is imparted to the severed pieces of band-iron, means for moving the severed pieces toward the smaller ends of said rolls, whereby the endwise motion is reduced in speed, and a stop-plate arranged in the path of said severed pieces, whereby their endwise motion is limited, substantially as described.

Dated this 21st day of December, 1897.

VICTOR E. EDWARDS.

Witnesses:
RUFUS B. FOWLER,
M. C. PRICE.